Sept. 4, 1923.
H. M. MILLER
1,466,798
APPARATUS FOR AND METHOD OF PEELING VEGETABLES OR FRUITS
Original Filed Dec. 5, 1921      3 Sheets-Sheet 1
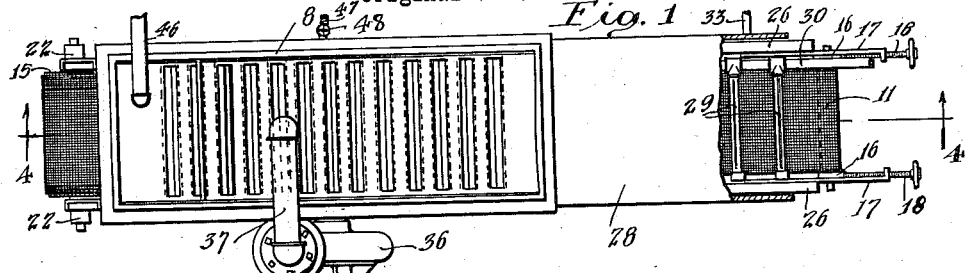
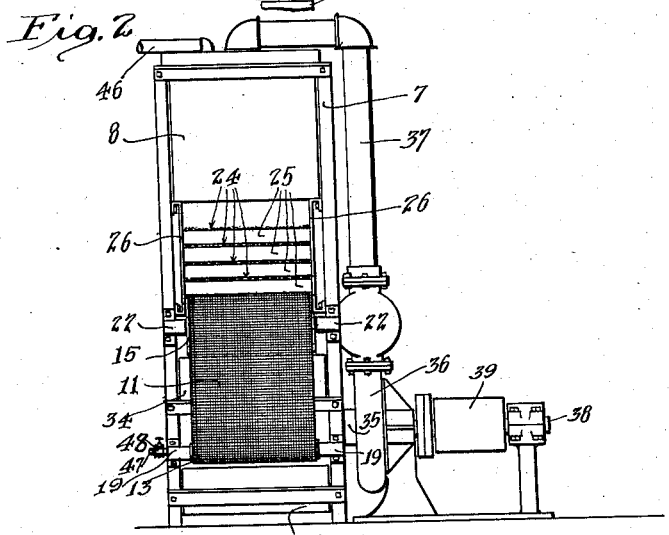
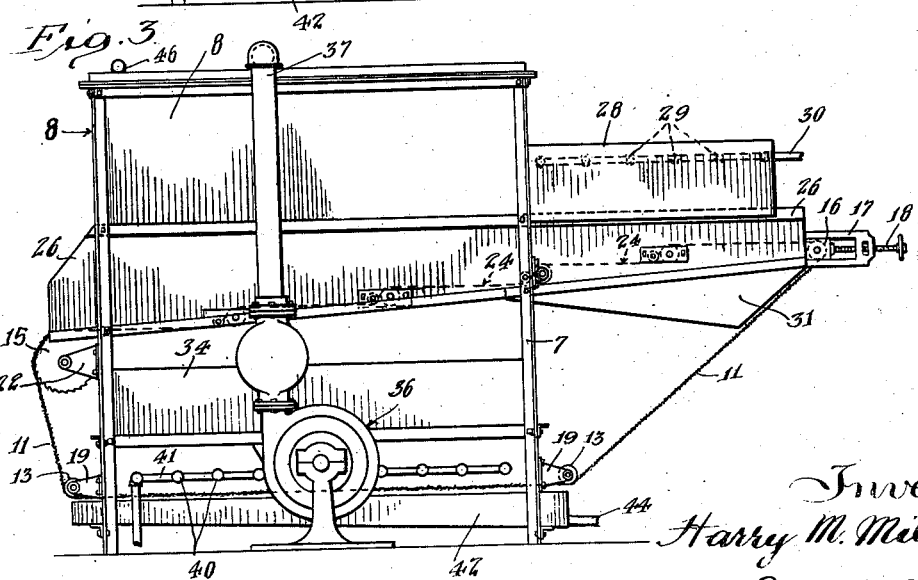
Inventor
Harry M. Miller
By Lyon & Lyon
attys Sept. 4, 1923.
H. M. MILLER
APPARATUS FOR AND METHOD OF PEELING VEGETABLES OR FRUITS
Original Filed Dec. 5, 1921   3 Sheets-Sheet 2
1,466,798
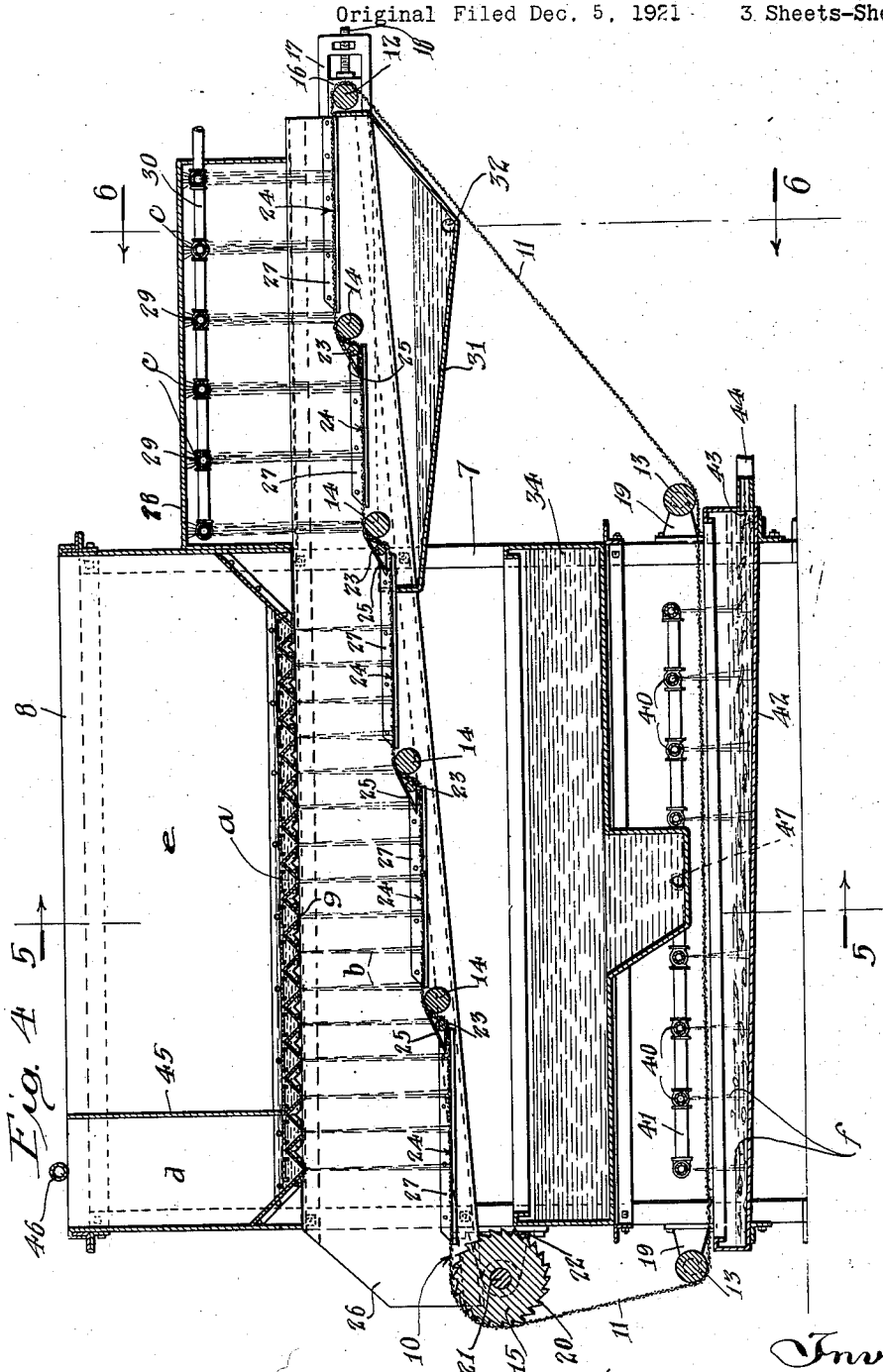

Sept. 4, 1923.　　　　　　　　　　　　　　　　　　　　　1,466,798
H. M. MILLER
APPARATUS FOR AND METHOD OF PEELING VEGETABLES OR FRUITS
Original Filed Dec. 5, 1921　　　3 Sheets-Sheet 3
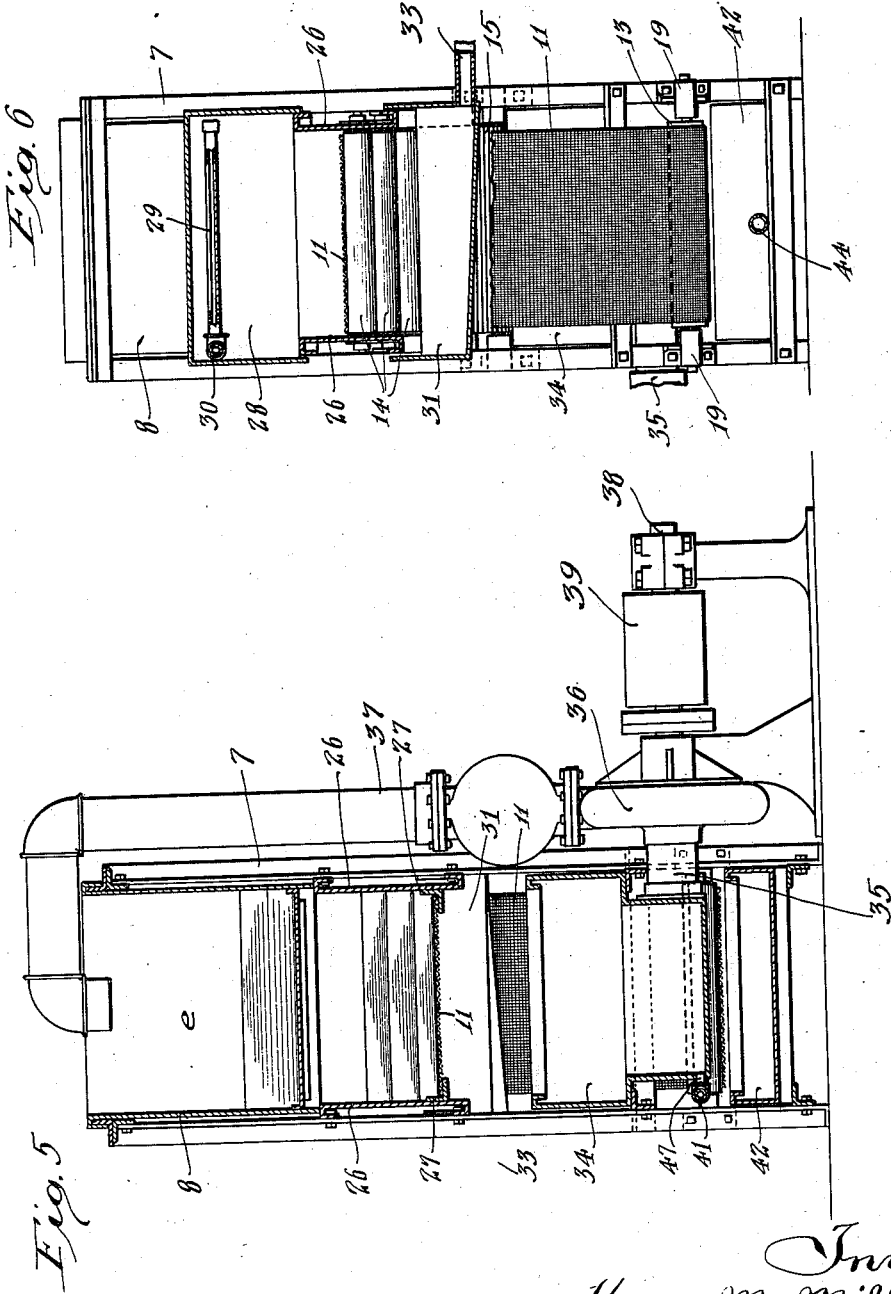

Patented Sept. 4, 1923.

1,466,798

UNITED STATES PATENT OFFICE.

HARRY M. MILLER, OF LOS ANGELES, CALIFORNIA, ASSIGNOR TO NATIONAL PEELING MACHINE COMPANY, OF LOS ANGELES, CALIFORNIA, A CORPORATION OF CALIFORNIA.

APPARATUS FOR AND METHOD OF PEELING VEGETABLES OR FRUITS.

Application filed December 5, 1921, Serial No. 519,964. Renewed July 9, 1923.

*To all whom it may concern:*

Be it known that I, HARRY M. MILLER, a citizen of the United States, residing at Los Angeles, in the county of Los Angeles and State of California, have invented a new and useful Apparatus for and Method of Peeling Vegetables or Fruits, of which the following is a specification.

This invention relates to a method of effecting the peeling of vegetables as, for example, tomatoes and fruits, as, for example, peaches; and the invention also relates to the apparatus used in performing some of the operations of the method.

An object of the invention is to effect the peeling of tomatoes and the like in an efficient manner.

Tomatoes and other pitless, pulpy bodies cannot be treated successfully for peeling, by the prior processes and apparatus employing peeling jets and invented for peeling peaches and the like, for the reason that in such prior processes and apparatus the water employed is of comparatively small volume and under pressure and is applied to the tomatoes with enough force to cause sufficient friction upon the skins to rub them from the pulp bodies. Such force and friction are detrimental to the pulp bodies of tomatoes, when the skins are being washed off, and I so construct my apparatus that relatively large volumes of water are delivered under substantially no head.

In carrying out the method, the tomatoes or fruits to be peeled are first treated with an alkali to loosen the skins, then the tomatoes are moved through a relatively fine spray or shower of water to wash them substantially free from the alkali, and then the tomatoes are moved through sheets of water falling a comparatively short distance from a tank containing a thin sheet thereof. The water is thus applied without the well-known peeling-jet action.

The accompanying drawings illustrate an apparatus built in accordance with the provisions of the invention and capable of performing some of the operations of the new method of peeling tomatoes or fruits.

Fig. 1 is a plan view of the apparatus.

Fig. 2 is an end elevation from the left of Fig. 1.

Fig. 3 is a front elevation of Fig. 1.

Fig. 4 is an enlarged longitudinal mid section on line indicated by 4—4, Fig. 1.

Figs. 5 and 6 are transverse sectional elevations on lines indicated by 5—5, and 6—6, respectively, Fig. 4.

There is provided, as indicated in the drawings, a suitable frame 7 having mounted on the upper portion thereof water-distributing means in the form of a tank 8 for water indicated at *a*. The bottom of the tank 8 is provided with a series of transversely extending openings or slots 9 so that the water, which is at such level as to just cover the bottom of the tank, will discharge in comparatively large volume and under zero pressure in transversely extending sheets, indicated at *b* in Fig. 4.

Preferably the tank 8 is partitioned at 45 into two separate chambers *d*, *e* to separate the water that is to discharge through some of the slots 9 from the water that is to discharge through other of the slots 9. The chamber *d* may be supplied with fresh, clean water by a pipe 46 projecting over the upper edge of the tank 8.

Extending beneath the slots 9 is a conveyor indicated in general by the character 10 and constructed as follows: An endless foraminous stepped belt 11 is movably mounted upon rollers 12, 13, 14 and 15. The roller 12 is mounted in members 16 which are adjustable in guides 17 by screws 18 for the purpose of tightening the belt 11 when said belt stretches. The rollers 13 are journaled in brackets 19 mounted on the ends of the frame 7. The roller 15 is provided with teeth 20 to engage and drive the belt 11 and is mounted on a driving shaft 21 which is journaled in brackets 22 mounted on one end of the frame 7. The shaft 21 is driven in any suitable manner. It is to be understood that the belt 11 may be otherwise driven, if desired. The belt employed by me had seven openings per lineal inch. This belt acts as a strainer to catch all of the skins of the tomatoes or fruit and permit the water to readily pass therethrough. Thus the water, after thus straining, is comparatively clean and, consequently, may be used over and over in the machine.

The rollers 14 are mounted at successively lower levels, begining at the second one from the right or feed end in Fig. 4, the first one of said rollers being in substantially the same plane as the roller 12. Adjacent each roller 14 is a smaller roller 23, beneath which the belt 11 passes. The lower faces of the rollers 23 are at substantially the same level as the next adjacent roller 14, to the left thereof in Fig. 4, so that the upper run of the belt extends in a series of steps indicated at 24. Above each roller 23 is a slanting plate 25. The upper edges of the plates 25 are spaced sufficiently from the upper faces of the rollers 14 to permit the belt to pass between the rollers 14 and said plates, and the lower edges of the plates are disposed close to the belt 11 so that the belt will run directly beneath said lower edges. Each plate 23 thus extends from adjacent a higher level to adjacent a lower level so that the tomato or fruit on reaching the upper end of the plate will roll down said plate onto the next lower step of the belt.

The frame 7 is provided directly below the level of the tank 8 with side walls 26 and to them are secured a series of angle iron tracks 27 which extend beneath the marginal portions of the belt 11 to aid in supporting the belt and thus prevent it from sagging, when the tomatoes or fruit are on the belt. Because of the belt 11 being stepped, the angle irons 27 will be positioned at different levels, as clearly seen in Fig. 4.

Mounted on one end of the frame 7 adjacent the tank 8, is a hood 28 and beneath said hood is a series of spray nozzles 29 supplied with water through tubing 30. The nozzles 29 are pointed upwardly so as to discharge the water sprays against the top of the hood to break the force of the water before it strikes the tomatoes or fruit upon the belt 11 as said belt moves beneath said nozzles. Beneath the belt 11 and directly under the hood 28 is a receptacle 31 to receive the water discharged by the nozzles 29. The bottom of the receptacle 31 preferably extends aslant downwardly toward a discharge opening 32, with which a waste pipe 33 connects.

Beneath a portion of the upper run of the belt 11 and under the tank 8 is a receptacle 34, to receive the water discharging from the slots 9 after said water passes through said upper run. The receptacle 34 is connected by an intake pipe 35 to a pump 36 which is provided with a discharge pipe 37 that extends upwardly above the level of the tank 8 and thence over its edge into the chamber e so as to deliver the water from the receptacle 34 into said chamber. The pump shaft 38 is provided with a pully 39 for driving the belt, or the driving may be effected by any other suitable means.

Immediately over the lower run of the belt 11 and beneath the tank 34 is a series of nozzles 40 supplied with water through tubing 41. The nozzles 40 are directed downwardly so as to discharge water through the lower run of the belt as the belt operates. Beneath the lower horizontal run of the belt and under the nozzles 40 is positioned a receptacle 42 having an outlet 43 connected to a waste pipe 44.

The method is performed, in part by the use of the above described apparatus, as follows:

The tomatoes or fruit to be peeled are treated with a suitable alkali, in a manner well understood in this art, to loosen the skins from the pulp bodies and to produce such openings in the skins of the tomatoes as may result from the alkali treatment. The tomatoes thus treated are then discharged upon the right hand portion of the upper run of the belt 11 and said belt moves the tomatoes or fruit through the water sprays indicated at c in Fig. 4. The water sprays c have no force other than that acquired by fall from the hood 28, and thus the water falls in a gentle shower and does not impinge upon the tomatoes with much force. The purpose of the sprays c is to merely wash off the alkali that has adhered to the skins, though some of the skins or pieces thereof may become detached from the pulp bodies. The water together with the alkali thus washed off passes through the belt 11 and discharges into the receptacle 31, from whence it is drawn off through the waste pipe 33. The belt 11 is actuated comparatively slowly and the tomatoes are carried in one position through some of the water sprays until they reach the first plate 23, whereupon the tomatoes are caused to roll down the plate 23 from the first to the second step 24 of the belt. The tomatoes are thus turned over so that other portions of the skin surfaces are accessible to the water sprays to provide that all sides of the tomato be washed free of the alkali.

The tomatoes continue moving toward the left or discharge end in Fig. 4, down the plates 23 at spaced intervals of time to successively lower levels to effect turning of the tomatoes at intervals from one position to another, said tomatoes being carried for an interval of time in each position through some of the water sheets b. These water sheets are of comparatively large volume under substantially no head, gravity alone being relied upon for discharging the water from a slight distance above the belt 11 upon the tomatoes or fruit. The relatively large volume of water produces in the aggregate as much friction on the skins as do the finer more forceful sprays of the prior invented machines employed, for example, in the peeling of peaches. In peeling tomatoes, more especially, it is essential that impact of the water upon the tomatoes be relatively slight so as not to crush and bruise the pulp bodies of the tomatoes. The water sheets $b$ do not injure the pulp bodies of the tomatoes, but the friction of the relatively large volume of water upon the skins tends to rub the skins from the pulp bodies, and the water also enters whatever openings have been produced in the skins so as to flush them from the pulp bodies. Fine water sprays discharged with force would not, to any great extent, enter the openings in the skins; but the water discharging from the slots 9, being of comparatively great volume and under substantially no head, the more readily enters any openings there may be in the upper portions of the skins so that it will penetrate into the tomatoes between the skins and pulp bodies and produce an outward pressure against the skins tending to split the skins which, therefore, will be flushed the more readily from the pulp bodies. All sides of the tomatoes are subjected to the peeling action of the water sheets $b$ during the passage of the tomatoes beneath the tank 8. Thus peeling of the tomatoes is effected in the main by a large volume of water under substantially no pressure, but before the tomatoes discharge from the left end of the belt 11 they receive a final rinsing with water free from alkali as they pass through the water sheets issuing from the chamber $d$.

If desired, the tomatoes may be cored and the blemishes removed before the tomatoes are discharged onto the belt 11, and the removal of the stem and blossom end and blemishes produces openings in the skins so that the sheets $b$ of water can the more readily penetrate beneath the skins of the tomatoes to force them outwardly from the pulp bodies and thus aid in their removal.

The water sheets $b$, after effecting their purpose, pass through the belt 11 into the receptacle 34 and the water is pumped from said receptacle back again into the tank 8 so as to be used over and over for effecting the peeling operation. This may be done without undue contamination of said water by alkali, since most of the alkali has been washed from the tomatoes by water from the nozzles 29 prior to the passage of said tomatoes through the water sheets $b$. Large wastage of water is thus avoided. The pieces of skin washed from the pulp bodies are deposited upon the belt 11 and tend to adhere thereto. As the belt 11 rotates the pieces of skin are washed from the belt by the water sprays $f$ into the receptacle 42 and pass with the water out of the receptacle through the waste pipe 44.

The fresh water continuously discharging in relatively small volume into the chamber $d$ mixes with that in the receptacle 34 and continually renews the peeling water, thus avoiding too great alkalinity thereof; and an equivalent volume of the peeling water discharges from the receptacle 34 through a waste pipe 47 provided with a valve 48.

Tomatoes have been mentioned above in the description of the operation of the apparatus because of the fact that they are among the most difficult vegetables or fruits to peel, as they crush and lose their juices, even under the action of the well-known peeling jets employed in peeling peaches. However, it is to be understood that the apparatus operates on other fruits and vegetables than tomatoes.

The skins of tomatoes do not disintegrate under the action of the alkali, as do the skins of peaches, and they remain tough. In the form of apparatus described above, the tomatoes roll or drop from a higher level to a lower level, thus effecting impact of the tomatoes upon the conveyor belt. The belt, being of woven wire, is more or less rough and produces a rubbing action upon the skins of the tomatoes as the tomatoes roll from the plates 25 onto the belt. The impact and rubbing aids in rupturing the skins so that the water can readily pass therebeneath. It is to be understood that, if desired, the tomatoes or other vegetable or fruit bodies being operated upon may have their skins punctured or otherwise ruptured before said bodies are fed onto the conveyor 24, but the necessity of this will depend upon the character of the vegetable or fruit being operated on.

I claim:

1. In a method of peeling vegetables or fruit, the combination of steps consisting in rolling the articles along a surface onto a moving surface to produce a rubbing action upon the skins of said articles, and discharging water upon said articles.

2. In a method of peeling vegetables or fruit, the combination of steps consisting in rolling the articles along a surface onto a moving surface to produce a rubbing action upon the skins of said articles, and passing the articles thus treated through water.

3. In an apparatus for peeling vegetables or fruit, the combination of an endless stepped belt, means to operate the belt, and means above the belt to discharge water onto the belt.

4. In an apparatus for peeling vegetables or fruit, the combination of an endless stepped belt, means to operate the belt, slanting plates above the belt extending from adjacent each level of the belt to adjacent the next lower level, and means above the belt to discharge water onto the belt.

5. In an apparatus for peeling vegetables or fruit, the combination of an endless stepped belt, means to operate the belt, separate receptacles beneath different portions of the upper run of the belt, and means to discharge water onto the belt portions above the receptacles.

6. In an apparatus for peeling vegetables or fruit, the combination of article moving and turning means, separate receptacles beneath different portions of said moving and turning means, and means to discharge water onto said portions above the receptacles.

7. In an apparatus for peeling vegetables or fruit, the combination of article moving and turning means, water spray means above a portion of said first means, and means above another portion of said moving and turning means to discharge larger volumes of water under substantially no head upon the articles as they are moving.

8. In an apparatus for peeling vegetables or fruit, the combination of stepped article moving means, slanting plates between adjacent steps for the articles to roll down from the higher step to the next lower step, and water discharge means above said moving means.

9. In an apparatus for peeling vegetables or fruit, the combination of water-distributing and discharging means, a foraminous belt beneath the water-discharging means, the space between the water-discharging means and belt being free and unobstructed to permit the water to fall directly upon the articles on the belt, and means to operate the belt.

10. In an apparatus for peeling vegetables or fruit, the combination of article-moving means, a receptacle for liquids beneath said moving means, a pump having its intake connected with the receptacle, means to distribute the liquid discharge from the pump upon the articles as they are being moved, and means above the discharge end of the article moving means to separately distribute a fresh supply of water upon the articles, said fresh water distributing means also being over the receptacle to discharge thereinto.

Signed at Los Angeles, California, this 29th day of November, 1921.

HARRY M. MILLER.

Witnesses:
GEORGE H. HILES,
L. BELLE WEAVER.